S. B. AUSTIN.
MOTION PICTURE APPARATUS.
APPLICATION FILED NOV. 20, 1914.
1,169,376. Patented Jan. 25, 1916.
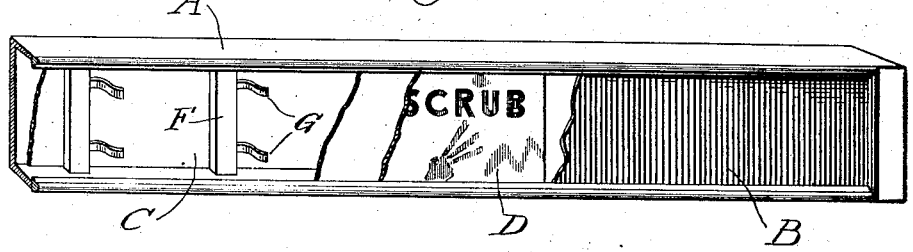
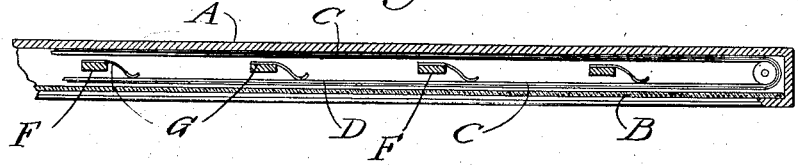
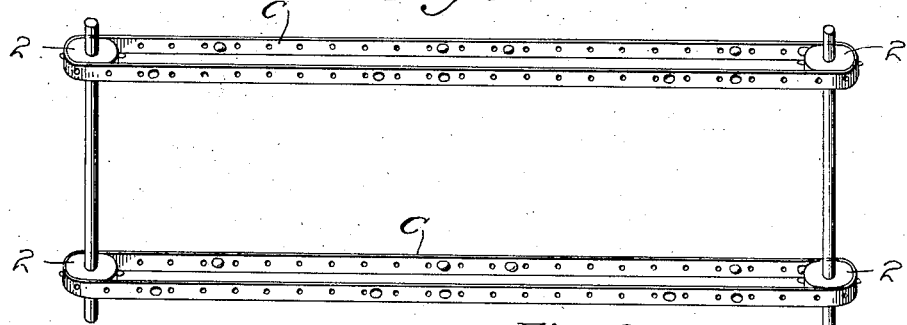
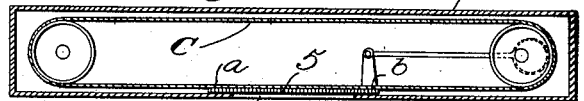
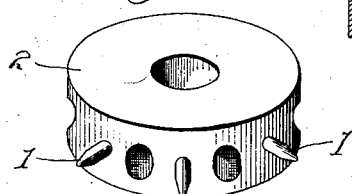
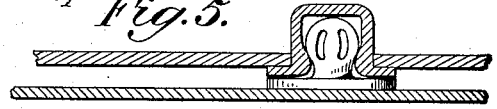
Attest:
E. M. Hamilton
Bessie I. Bishop
Inventor:
Sydney B. Austin.
by Spear, Middleton, Donaldson & Spear
Attys

UNITED STATES PATENT OFFICE.

SYDNEY B. AUSTIN, OF BALTIMORE, MARYLAND, ASSIGNOR TO AD-DISPLAY MACHINE CORPORATION, A CORPORATION OF VIRGINIA.

MOTION-PICTURE APPARATUS.

1,169,376.  Specification of Letters Patent.  Patented Jan. 25, 1916.

Application filed November 20, 1914. Serial No. 873,181.

*To all whom it may concern:*

Be it known that I, SYDNEY B. AUSTIN, citizen of the United States, residing at Baltimore, Maryland, have invented certain new and useful Improvements in Motion-Picture Apparatus, of which the following is a specification.

My invention relates to apparatus for producing motion picture effects, and it consists in the features of construction and arrangement and combination of parts hereinafter described and particularly defined by the appended claims.

In the accompanying drawings Figure 1 is a perspective view of the invention; Fig. 2 is a sectional plan view. Figs. 3, 4, 5 and 6 are views relating to a modification.

In carrying out my invention, the motion picture effect is produced by the use of a screen member or grating, which may be provided by parallel lines marked or otherwise suitably provided on a glass plate or other transparent material, and a picture-carrying member having a composite picture thereon, one of said parts being moved in relation to the other, so that different parts of the composite picture member will be exposed to view through the clear spaces between the lines or bars of the screen or grating member. This method of producing a motion picture effect is not new in itself, and my improvement relates to a particular form of apparatus in which the picture carrying member is in the form of a traveling band having formed thereon or carried thereby the composite pictures. This band is moved in rear of the screen member to bring different portions of the composite pictures to the clear spaces between the lines of the screen.

In the drawings, A represents a box or trough having at its front portion the screen member B. This may consist of a piece of glass or a number of pieces having vertical or inclined lines formed thereon, and preferably on the inner side, these lines having clear spaces between them. Within the trough or box an endless band C is mounted passing around rollers E, and this band carries the composite pictures, one of which is indicated at D. The band is pressed against the rear or inner face of the screen member by any suitable means so as to make a close contact, and in the particular arrangement shown I employ spring members G to secure this pressing effect. These springs are preferably mounted on posts F within the trough or box. Motion may be imparted to the endless band by any suitable means, such as by an electric motor, and the whole device may be mounted in a street car to occupy the space now used for advertising placards along the top of the car, though it will be understood that I do not limit myself to any particular use or situation in which the apparatus may be employed.

When used in a street car, the endless band may be driven through suitable connections with the axle of the car. The endless band may be of any suitable material, and the composite pictures may be formed directly thereon, or they may be formed on separate pieces mounted upon the band. The band may consist of a strip of flexible material having openings therein over which the composite picture members may be placed so that light rays may pass through the openings in the band and through the transparent picture members, so that the composite picture may be seen through the clear spaces of the screen member.

Any suitable means may be provided for holding the picture members to the band, and the band or carrier may be made of upper and lower traveling members to which the picture members are connected.

It will be understood that the composite pictures may be carried by non-transparent material, as the different portions of the composite picture will show through the clear spaces of the screen, being lighted up from the lights in the car, or during the daytime the composite pictures on the opaque material will show through the clear spaces of the screen.

The carrier for the composite pictures may be of the form shown in Fig. 3, consisting of two endless steel tapes having perforations to be engaged by projections 1 on the drums or ratchets 2, Fig. 4. The composite picture members may be secured to these steel tapes by any suitable form of connection, and these may be detachable. In the particular construction shown, snap buttons are employed, one member of the snap button being carried on the picture member and the other part of the snap button or fastening being carried by the endless tape or carrier, such a connection being shown in Fig. 5.

It will be seen from the above that the apparatus may be used with or without illuminating means, and the carrier may be either transparent or opaque.

One effect of employing a traveling carrier which as it travels in the same direction repeats the display of the several poses making up the composite motion picture is that pictures may be used which will simulate walking or running of the person or thing being exhibited because the picture will traverse a considerable distance from one end of the box to the other, or a dancing effect may be secured.

In some cases it may be desired to exhibit one composite picture for a considerable period and then change to another picture, which in turn, will be exhibited for a considerable period. In such a case, the carrier on which the composite pictures are mounted or formed will be operated intermittingly, and when the picture is brought to the display point and is at rest, the screen member will be operated to bring its clear spaces opposite different portions of the composite picture. Such an apparatus is shown in Fig. 6, in which 3 is the box containing the carrier C, the pictures on which may each be of a length from $a$ to $b$, there being a series of these. This band or carrier is moved intermittingly in any suitable way and at each action, it brings one of its pictures for display to the opening 4 of the box and through a screen 5 extending over the said opening. While the carrier is at rest with a picture located at the display point, the screen member is moved so that the different parts of the composite picture will be exposed to view successively through the clear spaces of the screen. The screen member may be arranged and operated in any suitable way but in the particular construction shown, it is moved back and forth, but its movement in one direction may be sufficient to display the picture. After displaying one picture, the carrier is shifted to bring another picture to the display point and then the operation is repeated of displaying the parts of this picture through the clear spaces of the screen. In changing from one picture to another the view of the screen and picture behind it, may be cut off by a shutter or in the case of employing a light to show through a transparent picture member and screen, this light may be put out or cut off during the time that the change of pictures is being made and these actions may be carried out by any suitable automatic mechanism.

I claim as my invention:—

1. In a motion picture apparatus, a transparent screen member having opaque lines with clear spaces between, an endless carrier, and composite pictures mounted on said endless carrier, said composite pictures moving in proximity to the screen member to expose the different parts of said composite pictures through the clear spaces of the screen, substantially as described.

2. In combination a screen member, an endless carrier having composite pictures, and means for pressing the composite pictures against the screen member as the said pictures travel along the screen member, substantially as described.

3. In combination a trough or box having a screen member at the front thereof, an endless carrier within the box having composite pictures thereon, said composite pictures moving in close proximity to the screen member to expose different parts thereof through the clear spaces of the screen, substantially as described.

4. In combination a rigid screen member, a flexible traveling member of transparent material having a composite picture thereon, and means for guiding the flexible member in its movement in close proximity to the screen member, substantially as described.

5. A motion picture apparatus comprising a relatively fixed screen member and a traveling composite picture member, with means for moving the latter to cause repetitions of the motion picture effect at different points along the screen, substantially as described.

6. A picture display apparatus comprising a composite picture member and a screen member, the latter having opaque portions with clear spaces for the display of the composite pictures, one of said members being in the form of an endless band, and means for moving said endless band, substantially as described.

In testimony whereof, I affix my signature in presence of two witnesses.

SYDNEY B. AUSTIN.

Witnesses:
F. L. MIDDLETON,
WALTER DONALDSON.